(12) United States Patent
Blanc

(10) Patent No.: US 6,401,913 B1
(45) Date of Patent: Jun. 11, 2002

(54) CONVEYOR DEVICE FOR PRODUCTS, IN PARTICULAR FRUITS, FOR FEEDING A UNIT FOR SORTING SAID PRODUCTS

(75) Inventor: Philippe Blanc, Montauban (FR)

(73) Assignee: Materiel pour l'Arboriculture Fruitiere, Montauban (FR)

( * ) Notice: Subject to any disclaimer, the term of this patent is extended or adjusted under 35 U.S.C. 154(b) by 0 days.

(21) Appl. No.: 09/530,213

(22) PCT Filed: Nov. 13, 1998

(86) PCT No.: PCT/FR98/02427
§ 371 (c)(1),
(2), (4) Date: Apr. 27, 2000

(87) PCT Pub. No.: WO99/30992
PCT Pub. Date: Jun. 24, 1999

(30) Foreign Application Priority Data

Dec. 16, 1997 (FR) .............................. 97 15957

(51) Int. Cl.$^7$ .............................. B65G 17/24
(52) U.S. Cl. ...................... 198/779; 198/387
(58) Field of Search ................. 198/384, 387, 198/779; 209/539, 580, 586, 912

(56) References Cited

U.S. PATENT DOCUMENTS 3,277,940 A * 10/1966 Henderson et al. ......... 198/387
4,005,774 A 2/1977 Valero
4,482,061 A * 11/1984 Leverett .................. 199/384
5,513,740 A 5/1996 Affeldt et al.

FOREIGN PATENT DOCUMENTS

| DE | 26 43 511 | 4/1978 |
|----|-----------|--------|
| EP | 0 230 583 | 8/1987 |
| FR | 1 445 689 | 10/1966 |
| FR | 2 716 874 | 9/1995 |

* cited by examiner

Primary Examiner—Joseph E. Valenza
(74) Attorney, Agent, or Firm—Young & Thompson

(57) ABSTRACT

The invention concerns a device conveying products, in particular fruits, for feeding a unit sorting said products, comprising a conveyor including a plurality of rollers (5) consisting or two parallel disks (9, 10) having the same diameter, borne by a transverse shaft (8) mounted freely rotating about an axis of rotation (7). Said conveyor further comprises two fixed lateral rails (11, 12) symmetrically arranged on either side of the disks (9, 10), and sloping towards said disks at an angle (α) relative to a plane (P) passing through the axis of rotation (7) of the rollers (5), said sliding rails being each arranged so as to present a lower edge (11a, 12a) extending in the proximity of the neighbouring disk (9, 10) and of each roller (5) transverse shaft (8).

14 Claims, 3 Drawing Sheets

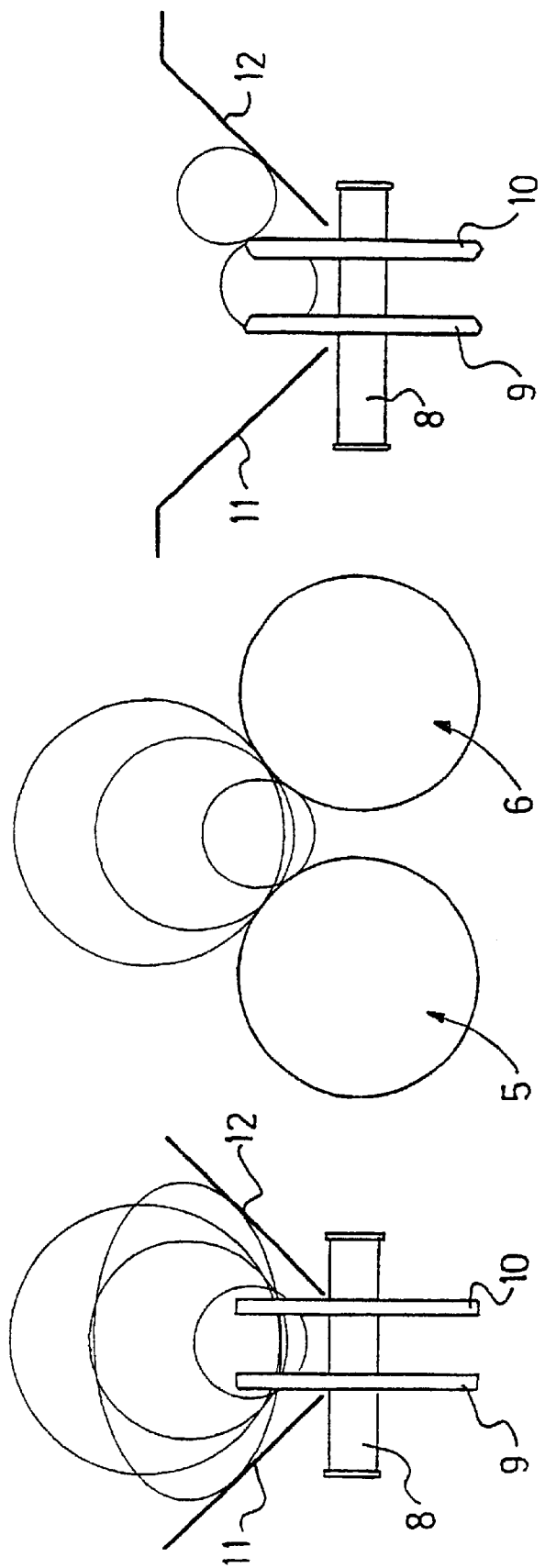

CONVEYOR DEVICE FOR PRODUCTS, IN PARTICULAR FRUITS, FOR FEEDING A UNIT FOR SORTING SAID PRODUCTS

BACKGROUND OF THE INVENTION

The invention concerns a device for conveying products, in particular fruits, designed to supply a unit for sorting the said products as a function of predetermined selection criteria.

Operations for calibrating fruits require the individualization thereof with a view to enabling them to be sorted as a function of selection criteria, such as weight, calorimetric aspect etc. To this end, sorting units include a feed conveyor which is able, from a flow of fruit delivered in bulk for example in a stream of water, to arrange these fruits behind each other so as to enable them to be analyzed individually and subsequently selected.

Such a feed conveyor is in particular described in the French patent FR-2 716 874 in the name of the applicant and includes a plurality of rollers, each mounted freely in rotation about a transverse rotational axle carried by an endless chain and extending orthogonally with respect to the latter, the said rollers being spaced so that two successive rollers define a housing between them for a product and consisting of parallel discs disposed orthogonally with respect to the rotational axle.

According to this patent, each roller additionally consists of four parallel discs defining a concave-shaped surface for supporting the products two lateral discs of the same diameter and two central discs with the same diameter less than that of the lateral disc.

It has however been found that such a feed conveyor, has several disadvantages, as do all feed conveyors existing at the present time. Indeed, these feed conveyors are dedicated to fruits with substantially similar dimensions for which the diameter and distance between the axles of the rollers are determined. On account of this, in practice, each sorting-unit is designed to carry out sorting of a given type of fruit, without the possibility of using it for other fruits with different sizes and/or shapes.

Moreover, current feed conveyors have proved to give a relatively low yield, namely a low loading rate, in particular for high feed rates.

Finally, current conveying devices also lead in particular for high feed rates, to the formation of doubles, consisting of the positioning of two fruits between two rollers, which results in the impossibility of sorting the said fruits forming the doubles in a selective manner.

In practice, the last two disadvantages lead to a limitation of the feed rates to the sorting unit and hence to non-optimized yields thereof.

SUMMARY OF THE INVENTION

The present invention aims at overcoming all these disadvantages and its object is essentially to provide a conveying device for feeding a sorting unit having an optimal throughput and reliability, and which can be used for the transport of products with very different sizes and/or shapes.

To this end, the invention concerns a conveying device, wherein:
  each roller has two parallel discs spaced by a distance (d) and having the same diameter, carried by a transverse shaft mounted freely in rotation about the rotational axle,
  it comprises two fixed lateral slides disposed symmetrically either side of the discs of the rollers, the said slides being inclined in the direction of the discs at an angle ($\alpha$) with respect to a plane (P) passing through the rotational axis of the rollers and each being disposed so as to present a lower edge extending close to the adjacent disc and the transverse shaft of each roller, and to form a bottomless chute, with a section in the shape of a truncated V, having a depth greater than the radius of the discs.

Such a conveying device thus includes two fixed lateral slides extending either side of the rollers substantially as far as the transverse shaft thereof and consisting of lateral surfaces for supporting the products which, associated with the shape of the said rollers composed of two discs of the same diameter, causes each of the products to be centered between two rollers.

In practice, it has been found that such a design enables, with a high feed throughput, fruits to be arranged one following the other between different rollers with an optimum filling rate for the conveying device.

Moreover, it has also been found that such a conveying device can transport, with the same yield and the same reliability, products with very different shapes and sizes which can in particular vary from a single to a triple size.

According to another characteristic of the invention, each slide is inclined at an angle ($\alpha$) substantially comprised between 45° and 48°, this range of angles proving, in point of fact, the best compromise to ensure the transport of small-products such as for example of the order of 30 to 40 millimetres and also the transport of products with much larger sizes, for example greater than 100 millimetres.

As a preferred example, in particular intended for the production of conveying devices for feeding fruit sorting units, each disc of the rollers has a diameter of the order of 80 to 85 millimetres, the said disc being separated transversely by a distance (d) of the order of 15 to 25 millimetres, and the distance between the rotational axles of the rollers being of the order of 95 to 105 millimetres. Such dimensions prove to be suitable for transporting fruit of which the size may vary within a range substantially comprised between 35 mm and 110 mm.

The lower edge of the lateral slides preferably include in addition, an outer hem so that a sharp edge is not presented which would damage the products.

According to another characteristic of the invention, the conveying device includes a rolling surface for the rollers able to produce rotation of the said rollers about their rotational axles This driving of the rollers in rotation leads, in point of fact, to improved distribution of the products between the said rollers.

Moreover, this rolling surface for the rollers advantageously consists of an endless belt associated with drive means capable of driving it with an adjustable speed of movement. The ability to adjust the speed of movement of the continuous belt makes it possible to modify the direction of rotation of the rollers and their rotational speed in one or other direction of rotation. Thus, according to the size and shape of the products, it is possible to favour:
  either the loading capabilities of the conveyor by ordering the rollers to rotate in the same direction as the direction of motion of the said conveyor, obtained with a speed of movement of the belt less than that of the conveyor,
  or the "doubling" capabilities of the conveyor by ordering the rollers to rotate in the opposite direction to the direction of motion of the said conveyor, obtained with a speed of movement of the belt greater than that of the conveyor.

According to another characteristic of the invention, the conveyor has a so-called analytical horizontal portion of its path, equipped with means for analyzing the external appearance of the product, the conveying device including, in the region of this horizontal analytical portion of its path, a rolling surface for the rollers capable of producing rotation of the said rollers about their rotational axles.

Moreover, this rolling surface advantageously consists of an endless belt associated with drive means capable of driving it with a speed of movement greater than the speed of movement of the conveying device. This endless belt thus enables the rollers to be driven and hence the products housed between the latter in a direction of rotation opposite to the direction of movement of the conveyor, which favours analysis of all the surface of the said products.

According to another characteristic of the invention, the slides are interrupted over a predetermined length along the horizontal portion of the path, upstream from the means of analysis.

This interruption of the slides makes it possible to remove any product which may be found "doubled" between two rollers with a view to recycling it.

BRIEF DESCRIPTION OF THE DRAWINGS

Other characteristics, objectives and advantages of the invention will become apparent from the following detailed description with reference to the accompanying drawings which show, by way of a non-limiting example, a preferred embodiment. In these drawings, which form an integral part of the present description:

FIG. 3 is a transverse diagrammatic view of this conveying device showing various types of products which can be transported, FIG. 4 is a partial longitudinal diagrammatic view of this conveying device also showing various types of products which can be transported, and FIG. 5 is a transverse diagrammatic view of this conveying device loaded with small-sized products.

DESCRIPTION OF THE PREFERRED EMBODIMENTS

Figure 1:
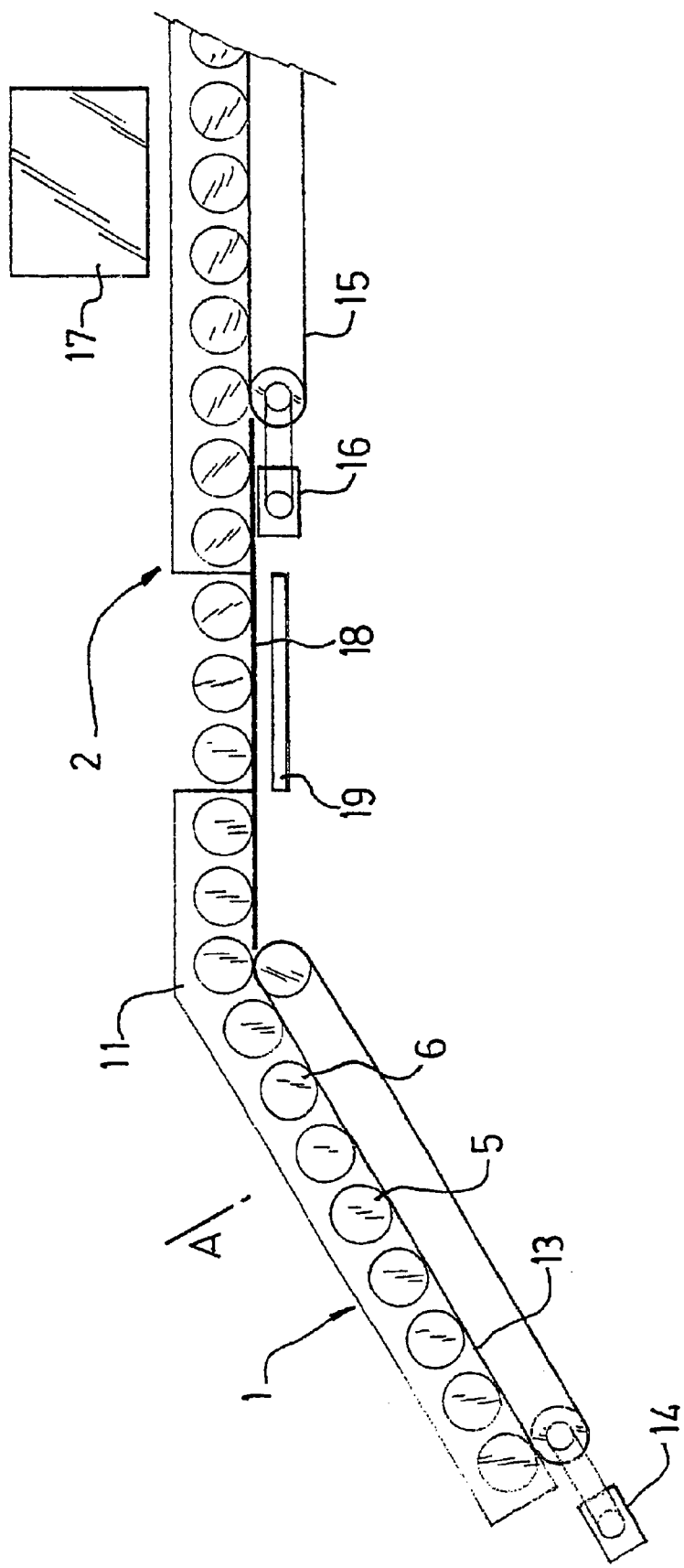
FIG. 1 is a diagrammatic longitudinal view of a conveying device according to the invention.
Figure 2:
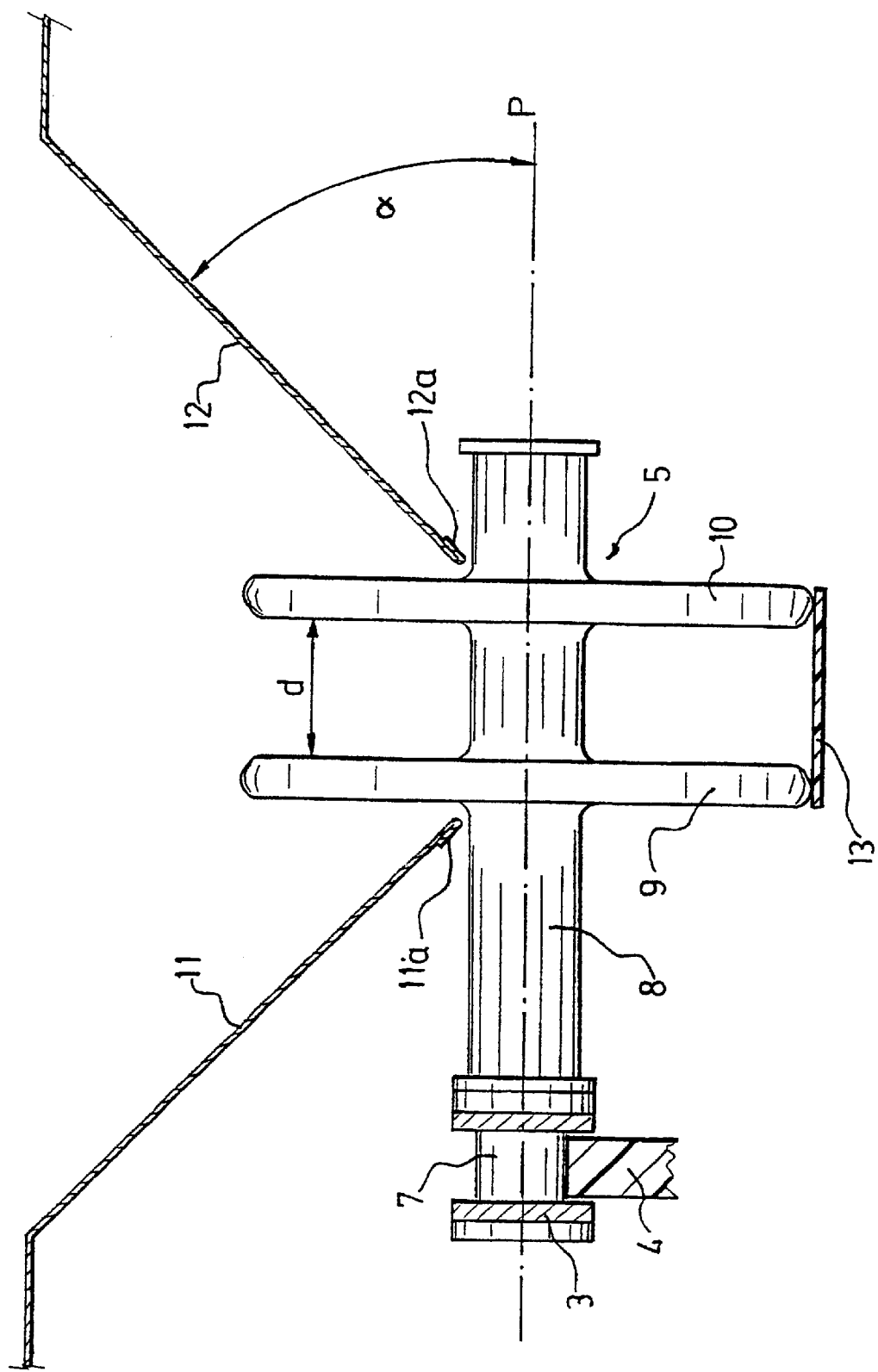
FIG. 2 is a cross section on an enlarged scale through a plane A showing one of the rollers of this conveying device.

The conveying device shown in FIGS. 1 and 2 is designed to equip a unit for sorting products such as fruits, such as in particular described in French patent FR-2 716 874 in the name of the applicant.

It comprises one or more parallel and identical conveying lines, one of which is shown in the figures by way of simplification, each having a loading zone 1 extending along an inclined ramp along which the products are arranged one after the other, and an optical analytical zone 2 formed by a horizontal portion of the path.

Each conveying line includes an endless chain 3 supported by a profile 4, and a plurality of rollers such as 5, 6 capable of defining two-by-two housings for the products, mounted freely in rotation each around a rotational axle 7 secured to the endless chain 3 and extending transversely with respect thereto.

Each roller 5, 6 consists of a hollow transverse shaft 8 mounted on the rotational axle 7 and two parallel discs 9, 10 with the same diameter extending radially about the transverse shaft 8. These discs 9, 10 additionally have a bevelled edge so as to define a concave shaped supporting surface for the products.

Moreover, in the example shown in the figures, the discs 9, 10 are arranged in an eccentric manner with respect to the transverse axis of symmetry of the shaft 8 so that they can be mounted in place of the rollers of the unit described in French patent FR-2 716 874.

By way of example, the characteristics of these rollers 5, 6 are as follows:

diameter of the discs 9, 10: 80 mm, distance (d) between two discs 9, 10 of the same roller 5, 6: 20 mm, distance between the rotational axles 7: 100 mm.

Each conveyor line additionally includes two fixed lateral slides 11, 12, arranged so as to extend longitudinally and symmetrically either side of the discs 9, 10 of the rollers 7, 8. As shown in particular in FIG. 2, these slides 11, 12 are inclined at an angle ($\alpha$) of 45° with respect to a plane (P) passing through the rotational axis 7 of the rollers 5, 6 so as to form a bottomless chute, with a section having a truncated V shape, of which the lower edges 11a, 12a extend to the immediate vicinity of the discs 9, 10 and the transverse shafts 8, and of which the depth is equal to approximately 1.5 times the radius of the said discs.

In addition, the lower edges 11a, 12a of the slides 11, 12 have an outer hem so as to prevent any risk of damaging the products.

Each conveyor line additionally includes, in the region of its loading zone 1, a rolling surface 13 consisting of an endless belt driven by means of a motor with a variator 14, capable of causing the rollers 5, 6 to rotate about their rotational axle 7.

Each conveyor line also includes, in the optical analysis zone 2, means of driving the rollers 5, 6 in rotation consisting of an endless belt 15 driven by a motor 16, capable of producing rotation of the said rollers in a direction opposite to the movement of the latter perpendicular to the optical means of analysis 17 of any known type such as a camera etc.

Finally, as shown in FIG. 1, the slides 11, 12 are interrupted along a predetermined length over the horizontal portion of the path of each conveyor line, upstream from the means of optical analysis 17. Moreover, a rolling surface 18 for the rollers 5, 6 is arranged at right angles to this zone and a transverse conveyor 19 for recycling the products is arranged under the said conveying line in the region of this interruption of the slides 11, 12.

Such a conveying device has a first advantage of enabling, with a high feed rate, products to be arranged one behind the others, each between two rollers 5, 6 with an optimum filling rate for each conveying line.

Moreover, if by accident two products become housed between two rollers 5, 6, the unbalanced product is automatically removed in the zone in which the slides 11, 12 are interrupted, on account, in particular, of the rotation of the said rollers 5, 6 at right angles to this zone, and are recycled via the transverse conveyor 19.

In addition, as shown in FIGS. 4 to 6, such a conveying device enables, by virtue of its design, products to be transported having very different sizes and shapes (for example with an overall spherical or ovoid shape). In practice, a conveying device having the dimensional characteristics stated above, thus enables fruits to be transported of which the diameter varies within a range substantially comprised between 35 mm and 110 mm.

Moreover, it should be noted that, as shown in FIG. 5, in the case of small fruits and when two fruits become housed between two rollers 5, 6, one of the fruits becomes supported by a slide 12 and, on account of the rotation of the said rollers, it is led to become housed between two rear rollers. On account of this, the conveying device retains its yield and reliability qualities even in the case of the transport of such small-sized fruits.

What is claimed is:

1. Device for conveying products, in particular fruits, designed to supply a unit for sorting such products, comprising a conveyor having a plurality of rollers (5, 6), each mounted freely in rotation about a transverse rotational axle (7) carried by an endless chain (3) and extending orthogonally with respect to the latter, the said rollers being spaced so that two successive rollers define a housing between them for a product and consisting of parallel discs (9, 10) disposed orthogonally with respect to the rotational axle (7), the said conveying device being characterized in that:

each roller (5, 6) has two parallel discs (9, 10) spaced by a distance (d) and having the same diameter, carried by a transverse shaft (8) mounted freely in rotation about the rotational axle (7), it comprises two fixed lateral slides (11, 12) disposed symmetrically either side of the discs (9, 10) of the rollers (5, 6), the said slides being inclined in the direction of the discs (9, 10) at an angle ($\alpha$) with respect to a plane (P) passing through the rotational axis (7) of the rollers (5, 6) and each being disposed so as to present a lower edge (11a, 12a) extending close to the adjacent disc (9, 10) and closer to the transverse shaft (8) than the periphery of each roller (5, 6), and to form a bottomless chute, with a section in the shape of a truncated V, having a depth greater than the radius of the discs (9, 10).

2. Conveying device according to claim 1, characterized in that each slide (11, 12) is inclined at an angle ($\alpha$) substantially comprised between 45° and 48°.

3. Conveying device according to claim 1, characterized in that the lower edge (11a, 12a) of each slide (11, 12) has an outer hem.

4. Conveying device according to claim 1, characterized in that each disc (9, 10) of the rollers (5, 6) has a diameter of the order of 80 to 85 millimetres, the said discs being separated transversely by a distance (d) of the order of 15 to 25 millimetres, and the distance between the rotational axles (7) of the rollers (5, 6) being of the order of 95 to 105 millimetres.

5. Conveying device according to claim 1, characterized in that the edges of the discs (9, 10) are bevelled so that the discs of each roller (5, 6) form a concave-shaped supporting surface for the products.

6. Conveying device according to claim 1, characterized in that it includes a rolling surface (13) for the rollers (5, 6) able to produce rotation of the said rollers about their rotational axles (7).

7. Conveying device according to claim 6, characterized in that the rolling surface (13) for the rollers (5, 6) consists of an endless belt associated with drive means (14) capable of driving it with an adjustable speed of movement.

8. Conveying device according to claim 1, characterized in that the conveyor has a so-called analytical horizontal portion (2) of its path, equipped with means (17) for analyzing the external appearance of the products, the said conveying device including, in the region of this analytical horizontal portion (2) of its path, a rolling surface (15) for the rollers (5, 6) capable of producing rotation of the said rollers about their rotational axles (7).

9. Conveying device according to claim 8, characterized in that the rolling surface (15) of the rollers (5, 6) includes, in the region of the analytical portion (2) of its path, an endless belt associated with drive means (16) capable of driving it with a speed of movement greater than the speed of movement of the said conveying device.

10. Conveying device according to claim 8, characterized in that the slides (11, 12) are interrupted over a predetermined length along the horizontal portion (2) of its path, upstream from the means of analysis (17).

11. A device for conveying products, comprising:

a plurality of spaced apart rollers carried by a conveyor, each of said rollers having an axial shaft transverse to a direction of movement of said conveyor and two parallel discs mounted on said axial shaft, said two discs having the same diameter, each of said two discs having an outside and an inside surface, each said inside surface being spaced from said inside surface of the other of said two discs, each said outside surface having a radially inner portion forming a corner with said axial shaft; and two lateral slides next to said rollers that are inclined toward said rollers to form a chute for the products that are moved by said rollers, said chute having a depth greater than a radius of said to discs, each of said lateral slides having an edge directly adjacent to said axial shaft and to a respective said outside surface at a respective said corner so that in cross section each said lateral slide extends radially from the respective said corner.

12. The device of claim 11, wherein each said roller has only two of said discs.

13. The device of claim 12, wherein each of said discs has a diameter of 80–85 mm, said two discs are 15–25 mm apart, and each said axial shaft is 90–105 mm from said axial shaft of an adjacent one of said rollers.

14. The device of claim 12, wherein said discs are inclined an angle of 45–48° to a plane parallel to said axial shaft.

* * * * *